United States Patent
Raju et al.

(10) Patent No.: US 11,664,053 B2
(45) Date of Patent: *May 30, 2023

(54) VIDEO CLIP, MASHUP AND ANNOTATION PLATFORM

(71) Applicant: HASHCUT, INC., Sunnyvale, CA (US)

(72) Inventors: Murali Raju, Sunnyvale, CA (US); Vijay Koduri, Sunnyvale, CA (US)

(73) Assignee: Hashcut, Inc., Sunnyvale, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 16/899,612

(22) Filed: Jun. 12, 2020

(65) Prior Publication Data
US 2020/0312371 A1    Oct. 1, 2020

Related U.S. Application Data

(63) Continuation-in-part of application No. 16/151,877, filed on Oct. 4, 2018, now Pat. No. 10,720,185.

(60) Provisional application No. 62/567,855, filed on Oct. 4, 2017.

(51) Int. Cl.
| | |
|---|---|
| *G11B 27/036* | (2006.01) |
| *G11B 27/34* | (2006.01) |
| *H04N 21/85* | (2011.01) |
| *G06F 3/16* | (2006.01) |

(52) U.S. Cl.
CPC ............ *G11B 27/036* (2013.01); *G06F 3/165* (2013.01); *G11B 27/34* (2013.01); *H04N 21/85* (2013.01)

(58) Field of Classification Search
CPC ..... G11B 27/036; G11B 27/102; G06F 3/165; H04N 21/85

USPC .......................................................... 386/248
See application file for complete search history.

(56) References Cited

U.S. PATENT DOCUMENTS

| | | | | |
|---|---|---|---|---|
| 5,202,961 A | * | 4/1993 | Mills | G11B 27/34 345/157 |
| 5,206,929 A | * | 4/1993 | Langford | G11B 27/034 725/86 |
| 5,237,648 A | * | 8/1993 | Mills | G11B 27/034 715/974 |
| 6,438,315 B1 | * | 8/2002 | Suzuki | G11B 27/329 |
| 7,356,242 B2 | * | 4/2008 | Nagasawa | G11B 27/34 386/280 |
| 7,549,128 B2 | * | 6/2009 | Snyder | H04N 5/268 715/810 |

(Continued)

*Primary Examiner* — Helen Shibru
(74) *Attorney, Agent, or Firm* — Rosenthal IP Law; Larry Rosenthal

(57) ABSTRACT

A system and method for simple video editing and playback is disclosed. A platform implementing the described system and method allows users to edit videos including by clipping, combining and annotating, without requiring local video storage. Rather, edited videos are represented by metadata enabling playback of the edited videos directly from embedded video players. Playback directly accesses the original content owners' source files, increasing their video views and watch time, and minimizing risk of inadvertent copyright infringement. A control loop switches between identically located visible and hidden pre-loaded embedded video players in order to present seamless playback. A transparent annotation layer in a substantially identical location as the embedded video players allows for annotations to be mapped onto video playback.

10 Claims, 6 Drawing Sheets

(56) References Cited

U.S. PATENT DOCUMENTS

| | | | | |
|---|---|---|---|---|
| 8,009,966 B2* | 8/2011 | Bloom | .................. | G11B 27/34 |
| | | | | 704/235 |
| 8,661,366 B2* | 2/2014 | Snyder | ................ | G11B 27/034 |
| | | | | 715/810 |
| 10,720,185 B2* | 7/2020 | Raju | ...................... | G11B 27/10 |
| 2015/0220300 A1* | 8/2015 | Reynaga | ............. | H04N 7/0806 |
| | | | | 345/1.3 |
| 2018/0350404 A1* | 12/2018 | Zirnheld | ................ | H04N 5/268 |

* cited by examiner

VIDEO CLIP, MASHUP AND ANNOTATION PLATFORM

CROSS-REFERENCE TO RELATED APPLICATION

This application is a continuation-in-part of U.S. application Ser. No. 16/151,877, filed on Oct. 4, 2018, which claims priority to U.S. Provisional Appl. No. 62/567,855, filed on Oct. 4, 2017.

FIELD OF THE INVENTION

The invention relates to video editing software and video playback.

BACKGROUND

There are over 2 billion people globally that engage with social video, on YouTube, Facebook, Twitter, Snapchat, and other sites and applications. Oftentimes, users want to share specific portions of a video that already exists, but there is no easy way to do it. Today, they must download the video, edit it using desktop video editing software like Adobe Premiere or Apple Final Cut, save, and then re-upload it. The challenge is that this is very time consuming (minimum 30 minutes), and in many instances, risks violating the intellectual property rights of creators who did not give permission to use or publish the videos. Further, video editing software can be difficult to use for all but the most technically savvy producers.

For instance, an example of video that is widely watched and would greatly benefit from simple, non-infringing editing and playback is sports video. There are 4-5 billion sports fans around the world, possibly even more. Soccer alone has documented 4 billion fans. Many of these fans don't have the time to watch full games; instead, they want to see highlights. They also want to personalize and share these highlights. Sports clips are quite reliably subject to copyright claims by vigilant owners, so a system and method of sharing clips without violating copyright is needed.

SUMMARY

It is an aim of the present invention to provide a straightforward tool for cutting, annotating and compiling videos without the need for complicated editing software or storage needs, as well as the means to view the edited videos. It is a further aim of the present invention to rely solely on embedded video players provided by platforms to which content creators have already licensed intellectual property rights to their videos, therefore removing the risk of inadvertent, unlicensed use. This is beneficial for the creators and content owners, because the clips point back to the content owners' source files, increasing their video views and watch time. For example, YouTube creators that have monetized their videos will continue to receive advertising income because videos play directly from YouTube into the platform. This structure also enables content creators to implement restrictions and gain analytics which they would be unable to do if a user downloaded the original video, made a separate video file of a clip, and uploaded and shared that new file.

It is a further aim of the present invention to provide a platform on which users can view, edit and share online videos, including cutting clips, annotating them with text, emoji & stickers, and creating and mashups of multiple clips and/or videos. It is a further aim of the present invention that edited clips, highlights, mashups, etc. . . . do not require full videos to be stored, and instead only minimal metadata is required to perform playback. Thus, the platform can be implemented as a mobile or web-based application that can be used by anyone, without hefty storage requirements, and the entire process of finding, editing, and sharing can take only a few seconds.

It is further contemplated that the platform comprises a novel annotation system, wherein the annotations may be displayed in a transparent overlay over the platform's embedded video player, instead of being burned into brand new videos. Because the annotation layer is separate from the underlying, embedded video, the system can incorporate myriad algorithms to design and control the annotations. Some of the benefits of using a separate annotation layer include: annotations can be created from algorithms that analyze user data; the system affords more control over the annotations such as incorporating permissions; and annotations can even be created from visual recognition and machine learning algorithms that interpret the type of video being played.

DETAILED DESCRIPTION

Figure 1:
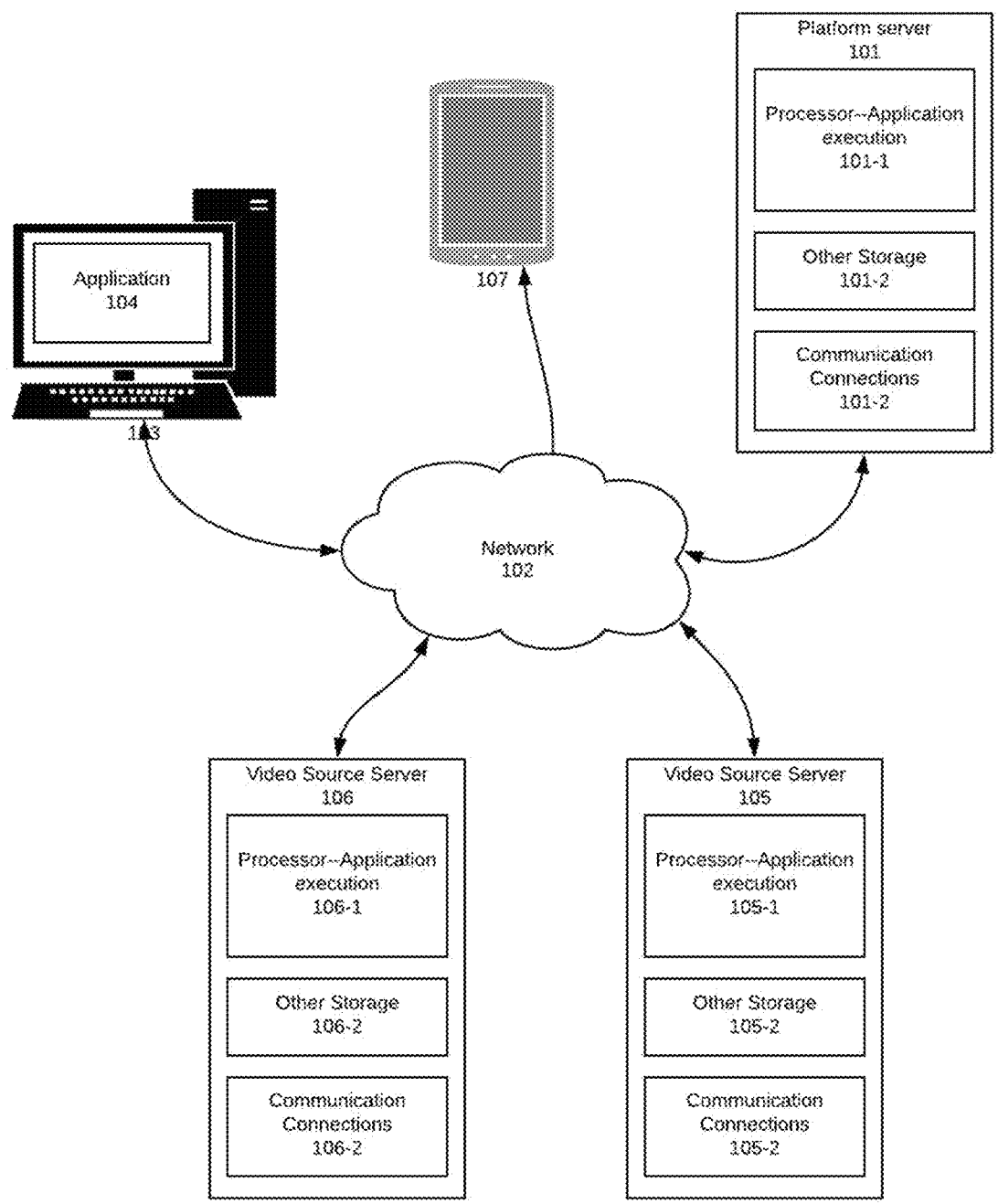
FIG. 1 is a block diagram of an exemplary system architecture of the invention.
Figure 2:
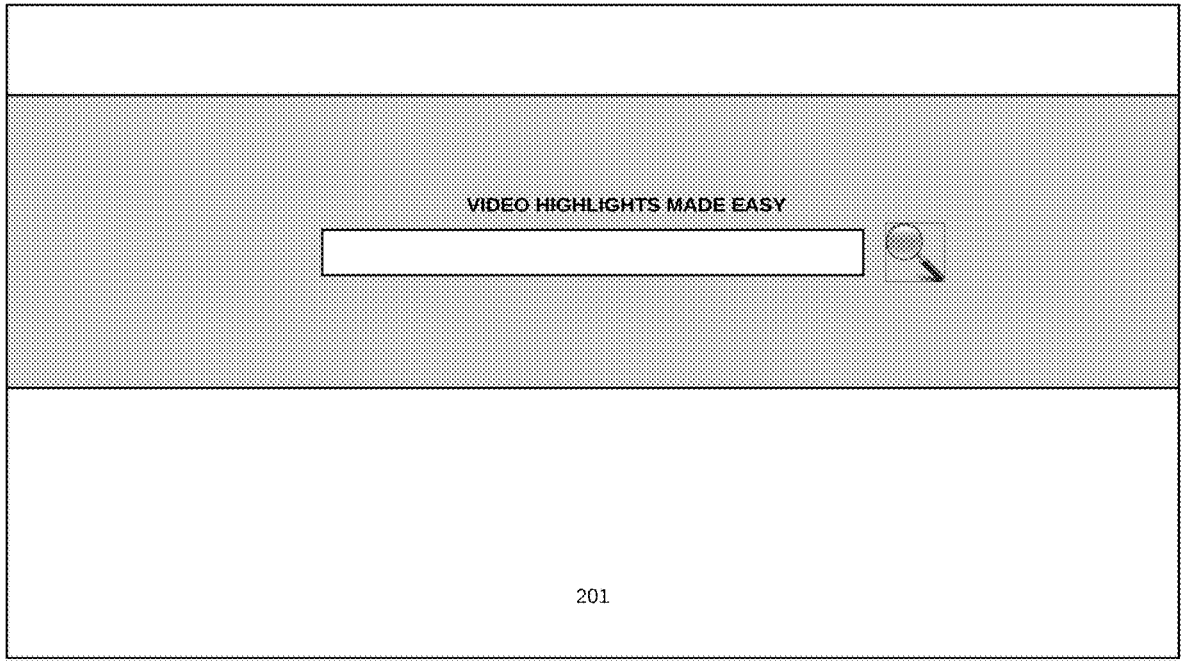
FIG. 2 illustrates an exemplary user interface for searching for videos according to the invention.
Figure 3:
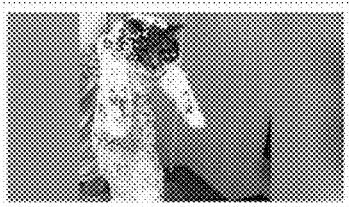
FIG. 3 illustrates an exemplary user interface for viewing and selecting search results of videos according to the invention.
Figure 3:
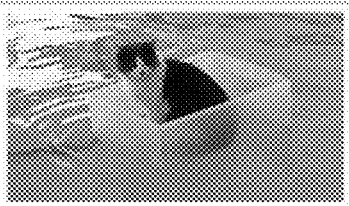
Figure 3:
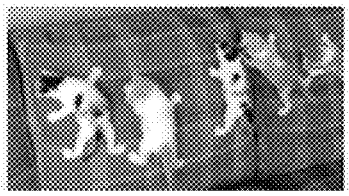
Figure 4:
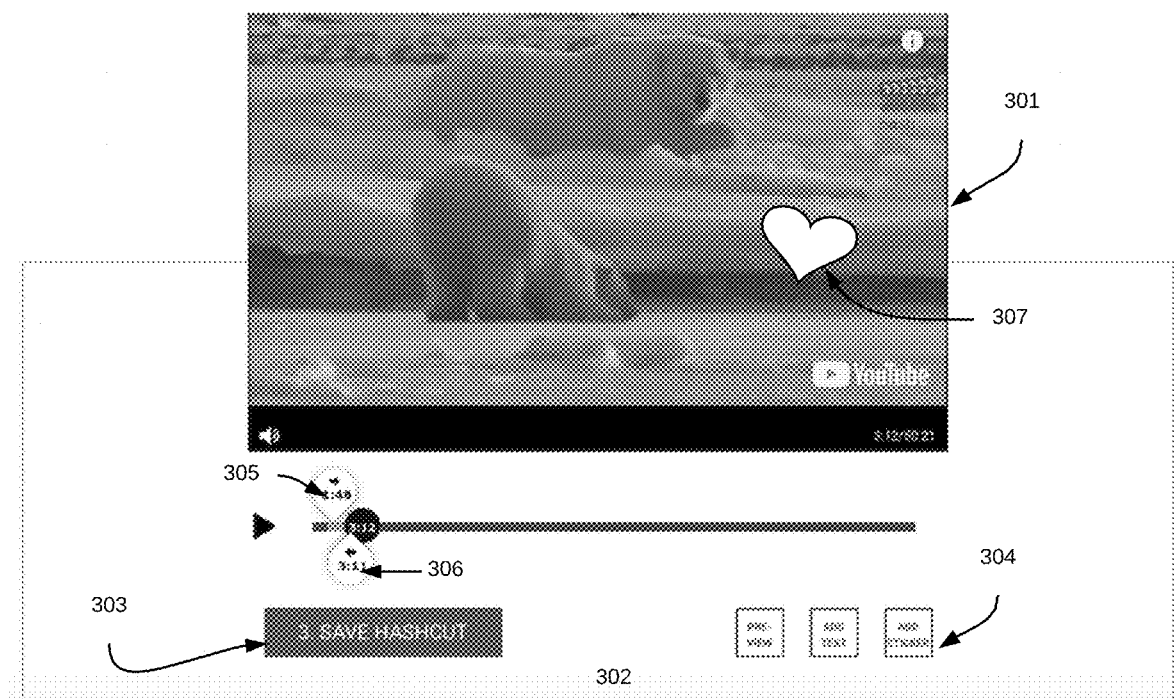
FIG. 4 illustrates an exemplary user interface for viewing and editing a video selection according to the invention.
Figure 5:
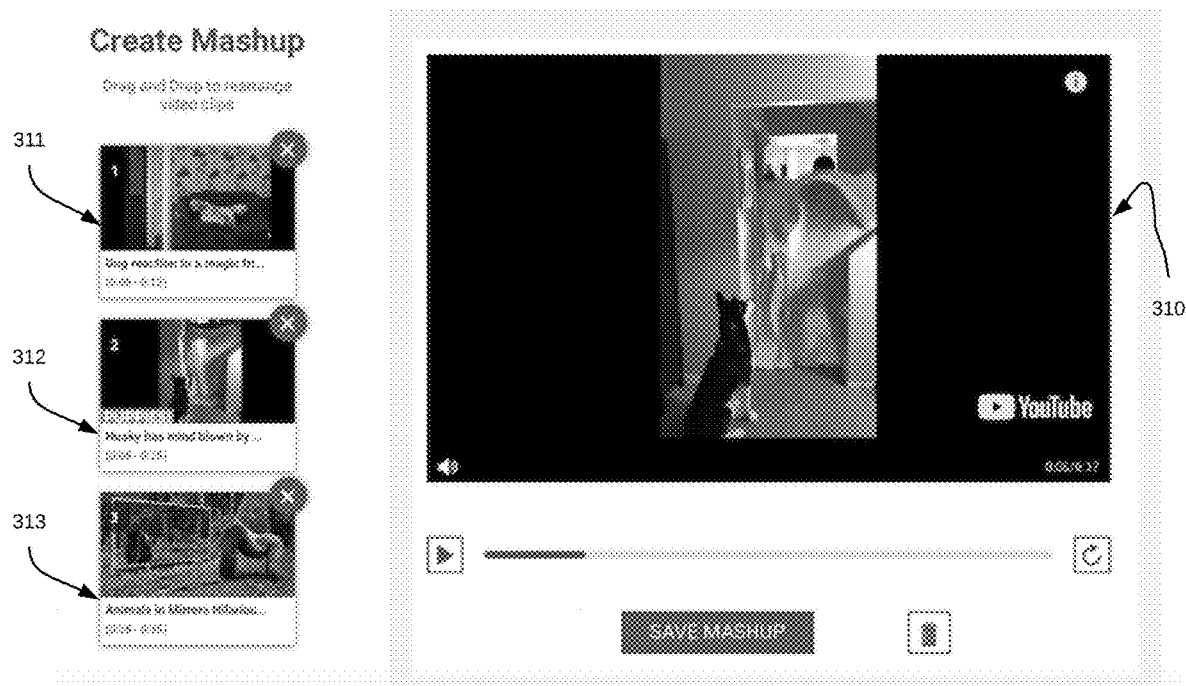
FIG. 5 illustrates an exemplary user interface for viewing and editing a mashup according to the invention.
Figure 6:
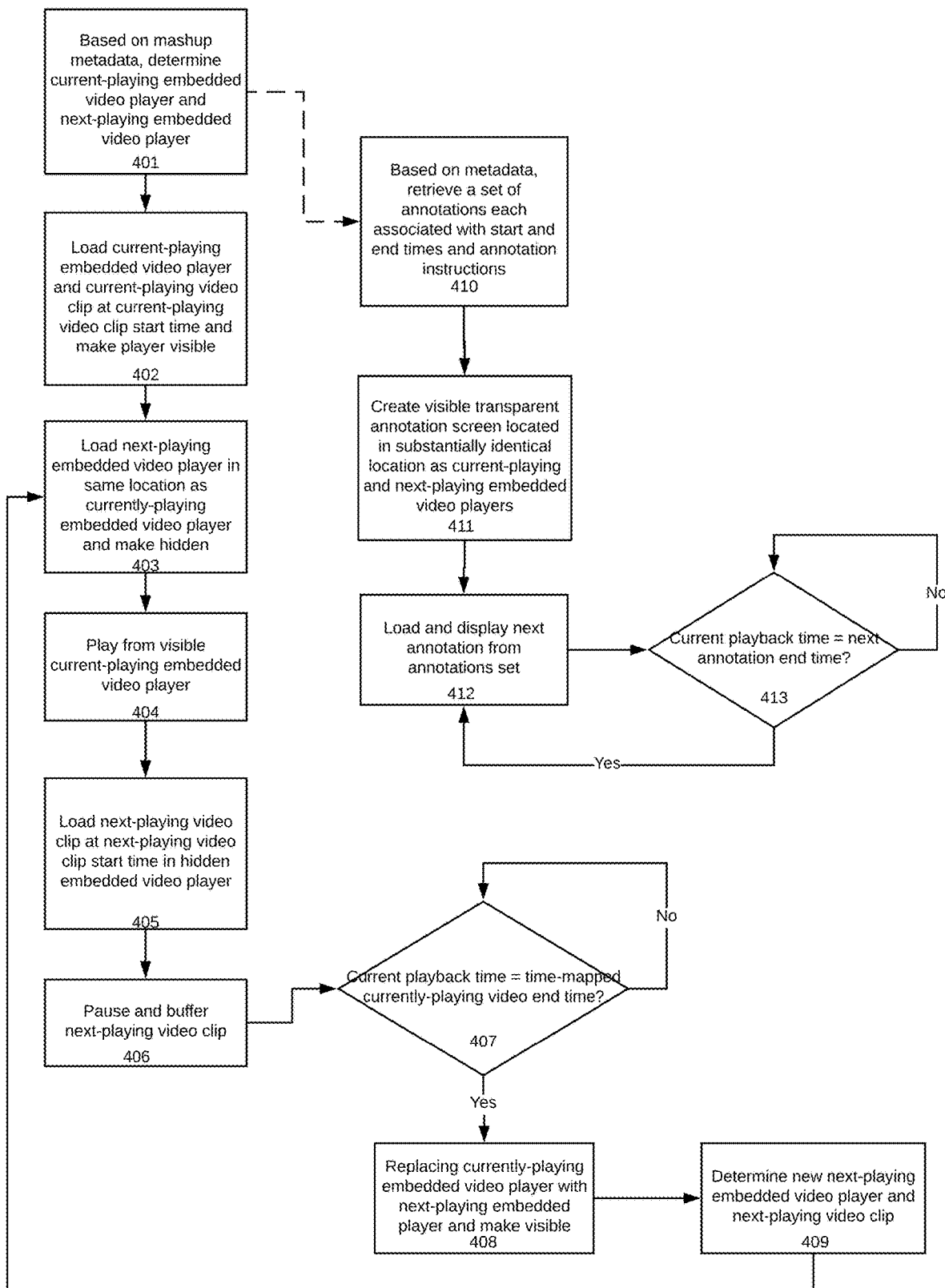
FIG. 6 illustrates steps of a method for playing digital video mashups according to the invention.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. The proper scope of the invention is defined by the claims, and therefore the following detailed description does not limit the invention but serves to give further description to the claims.

The present invention may be a system, a method, and/or a computer program product. The computer program product may comprise a computer readable storage medium (or media) having computer readable program instructions thereon for causing a processor to carry out the processes of the present invention. Computer readable program instructions described herein can be downloaded to respective computing/processing devices from a computer readable storage medium or to an external or remove computer or external or remote storage device via a network, for example, the Internet, a local area network, a wide area network and/or a wireless network. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Ruby, Java, C++ or the like, and conventional procedural programming languages, such as the "C" programming language or similar programming languages.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The computer readable program instructions are executed on a platform server [101], which is connected to a network [102], for example, the Internet, a local area network, a wide area network and/or a wireless network, and accessed through an Internet browser [104] or other application or "app" on one or more user computing devices [103] and [107]. It will be understood, however, that the computer readable program instructions may also be downloaded and executed entirely or partly on a user's computing device. One of the user computing devices may be a user computing device capable of running a virtual reality (VR) or an augmented reality (AR) application, such as a handheld or wearable device.

In the embodiment depicted in FIG. 1, instructions are executed by the processor [101-1] of the platform server [101]. The processor [101-1] can access a database or other storage [101-2] in which data pertaining to the system and method of the present invention are stored. Depending on the configuration and type of computing device, other storage [101-2] may comprise, but is not limited to, system memory, volatile (e.g. random access memory (RAM)), non-volatile (e.g. read-only memory (ROM)), flash memory, or any combination. Any suitable combination of hardware, software, or firmware may be used to implement the memory storage and processing unit. For example, the memory storage and processing unit may be implemented with platform server [101] or any other computing devices in combination making up the platform server, wherein functionality may be brought together over a network in a distributed computing environment to perform the functions described herein.

A user accessing the system and methods of the present invention is provided with a user-interface [201] allowing the user to search for videos on one or more video source sites, such as YouTube or Vimeo, which are accessible over a network. Two video source servers [105] and [106] are depicted in FIG. 1, but any number of video source servers may be accessed. The user's search query is sent to the video source sites and matching videos are returned [202]. When a video is selected for editing, the existing embedded video player [301] for the video is launched for playback and editing. A simple editing interface [302] is provided for editing. A recording button [303] enables simple "recording" of the desired clip, allowing for a start time [305] and end time [306] to be associated with each video clip and stored. Multiple clips may be created and saved to create a mashup. A mashup is defined as comprising two or more video clips, playable in succession. When the mashup is saved, in lieu of storage of the entire video, basic video metadata for a selected video is stored, including, but not limited to the type of video (e.g. YouTube, Vimeo, etc. . . . ), the unique video ID for accessing the video, and the existing and/or user-selected start and end time.

Additional radio buttons [304] allow annotations such as stickers and text to be added to the clip. Each annotation [307] is associated with a start time and an end time and instructions for its display, such as its appearance and location. Popular annotations on videos, clips and gifs include text and emojis, but can also include sound annotations, stickers, and even other videos. Annotations may even be dynamically created based on input from external sources such as user data. For instance, based on a user's likes and interests, annotations highlighting moments in a particular video may be created and saved. Whereas existing editors burn annotations onto a newly rendered video file, here annotation information is simply associated with the video clip or mashup and stored in the platform database. Where a mashup is stored, each video clip may be associated with one or more annotations, each with unique instructions and/or start and end times.

When playback of a video clip or mashup is requested, the following steps are performed: by accessing the stored, the appropriate embedded video player for each video clip is determined [401] for embedding in a single video playback area [310], where only the currently playing embedded video player is made visible [402], and any other embedded video players are made hidden [403]. For instance, if the first video clip [311] is a YouTube video while the second video clip [312] is a Vimeo video, the YouTube embedded video player is loaded into video playback area [310] and made visible, while the Vimeo embedded video player is loaded into the same video playback area [310] but made hidden. Using the first video clip information in the mashup metadata, the first video clip is loaded [402] to the first video clip start time and played [404]. The next video clip is loaded [405] to the next video clip start time—as specified in metadata—and paused and buffered if necessary [406] so it is ready to play. Buffering may be necessary when the clips are extremely short, or the device's processor speed is slow. If a video clip has been loaded in a hidden player but is still buffering, the players are switched while buffering completes. If the video clip has yet to load in the hidden player, then it will simply be loaded in the visible player, where it will begin playing after buffering is complete. Thus, most buffering occurs in the hidden player in the background, so that the user's experience is of watching one, integrated video file.

The main control loop monitors [407] current playback time, and when the current playback time of the mashup reaches a time-mapped currently-playing video end time, the currently-playing embedded player is replaced [408] with the next-playing embedded player and made visible. The cycle repeats with a new, next-playing embedded video player is determined from the mashup metadata and loaded [403] in the same location as the currently-playing embedded player and made hidden. The new, visible currently-playing embedded player, which was previously loaded with the next-playing video clip, is played [404] seamlessly after the previous video clip ends. The new, next-playing video clip is loaded [405] into the next-playing embedded video player at the next-playing video clip start time, paused and buffered if necessary [406]. The main control loop may determine the next-playing video clip and associated embedded player in response to user feedback, data, or other inputs. These steps [403] to [409] are repeated until metadata defines no new next-playing embedded video player or next-playing video clip, i.e. until all of the video clips in the mashup have been played.

In order to determine whether current playback time has reached a particular video clip end time, the start and end points of each video clip should be mapped onto the playback time of the mashup. The time-mapped currently-playing video start point is defined as the total playing time of all previously played video clips, and the time-mapped currently-playing video end point is defined as the total playing time of all previously played video clips plus the currently-playing video end time minus the currently-playing video start time. It should be noted that time-mapping takes into account seeks and skips, in other words that the total playing time of all previously played video clips includes the total time of seeks and skips. As an example, in a 2-minute mashup composed of four different video clips played from 1:00 to 1:30, the time-mapped currently-playing video start time of the fourth video is 1:30 and the time-mapped currently playing video end time of the fourth video is 2:00. This time-mapping can occur when the mashup is created and its associated metadata stored, at run-time, or at any other time between creation and playback.

By using embedded players, the platform design has multiple advantages. The creator receives all of the view counts and watch time on the original video (e.g. YouTube views), can control the video's permissions such as by restricting viewing to specific geographic regions, can access detailed analytics even as the video is shared beyond the original post, and still receives pass-through advertising revenue because the original video is still being shown. Meanwhile, less computing infrastructure is needed by the host of the platform, since only video location and timing instructions are stored.

Where a mashup includes annotations, as previously described, playback also includes the following steps: based on the metadata, the associated set of annotations is determined [410]. Each annotation is associated with a start and end time and annotation instructions, such as the annotation to display, its location, or even instructions for generating the annotation. The start and end time for each annotation may be specified with respect to the length of the mashup, they may be calculated from an associated video clip position within the mashup, or they may be generated from other algorithms. A visible and transparent annotation screen is created [411] in the substantially identical location as the current- and next-playing embedded video players. Each annotation from the annotation set is displayed [412] on the annotation screen from a time-mapped annotation start time until a time-mapped annotation end time. The control loop monitors [413] the current playback time to show each annotation, until all of the annotations in the annotation set have been played.

The time-mapped annotation start and end times may be determined similarly to the time-mapped currently-playing video clip start and end times. Where the annotation start and end times are associated with a video clip, the time-mapped annotation start time equals the total playing time of all previously played video clips plus the annotation start time minus the currently-playing video clip start time, and the time-mapped annotation end time equals the total playing time of all previously played video clips plus the annotation end time minus the currently-playing start time. For example, if a video clip has a start time of 0:10 and an end time of 1:00, and is associated with an annotation with start time 0:30 and end time of 0:40, the time-mapped annotation start time is the total playing time of all previously played video clips plus 0:20, and the time-mapped annotation end time is the total playing time of all previously played video clips plus 0:30. Moreover, a video clip may be associated with a set of annotations, each with different start and end times. In other embodiments, annotation start and end times need not be specified at all, and instead may be associated with a video clip for playback during the entire span of the video clip. In such embodiments, the time-mapped annotation start time simply equals the video clip start time, and the time-mapped annotation end time simply equals the video clip end time. Annotations need not be associated with video clips, for in other embodiments a set of annotations may be associated with the mashup itself. In other words, time-mapped annotation start- and end-times may be converted and stored in metadata before playback, calculated at run-time, or by any other method. It will be noted that, as in time-mapping for video clip playback, time-mapping of annotations also takes into account seeks and skips, in other words that the total playing time of all previously played video clips includes the total time of seeks and skips.

Using a transparent annotation layer gives system-level control over annotations. Because the annotation layer is controlled by the system, permissions and restrictions on annotations can be implemented. For instance, banned words that can't be used in annotations may be enforced or changed even after the video has been shared. The transparent annotation layer may be located on a different screen than the embedded video location, for instance in the case of AR or VR applications which allow content to be displayed over live video, location or position data.

The system and method of the present invention has applications beyond mashups that are shareable on social media for entertainment. As another example, the system and method described above facilitate video editing in applications where rapidly clipped and annotated videos are beneficial, such as news or workflows where groups of users need immediate access to edited videos. The traditional workflow for video editing, often involving multiple editors working on a single project, requires each editor to download video content to be edited on a local workstation. When editing is complete, a set of "final" assets are uploaded to a server. If multiple editors work on the same project, their changes must be manually resolved. Because all changes must be resolved locally, this method is very cumbersome with large groups.

Using the present invention, native videos reside on a central server or with their owners, all "edits" are tracked in the system database, and rendering of the final clip or mashup occurs dynamically at a client upon playback. This eliminates the need for rendering and storing enormous, high-resolution video files, and manually resolving changes to those files. Without the need for local storage, edits may be made remotely and on mobile devices, as all edits are simply updates to a database via the video and/or mashup metadata. Edits by multiple users can be accommodated using existing distributed database protocols. As a result, the systems and methods described here have valuable applications in real-time, distributed editing.

The invention claimed is:

1. A computer-implemented method for playing a digital video mashup comprising the steps of:
   a. receiving a currently-playing video clip access location associated with a currently-playing embedded video player, a currently-playing video clip start time and a currently-playing video clip end time;
   b. loading the currently-playing embedded video player and making the currently-playing embedded video player visible in an embedded video location on a first screen;
   c. loading, in the currently-playing embedded video player, a currently-playing video clip from the currently-playing video clip access location, at the currently-playing video clip start time;
   d. playing the loaded currently-playing video clip;
   e. in response to an input during playing of the currently-playing video clip,
      i. loading a next-playing embedded video player in the embedded video location,
      ii. making the next-playing embedded video player hidden,
      iii. loading a next-playing video clip from a next-playing video clip access location, at a next-playing video clip start time;
   f. when total playing time reaches a time-mapped currently-playing video clip ending time, wherein the time-mapped currently-playing video clip ending time equals the currently-playing video clip end time less the currently-playing video clip start time plus a total playing time of all previously played video clips, making the currently-playing embedded video player hidden and the next-playing embedded video player visible; and
   g. playing the loaded next-playing video clip.

2. The method of claim 1 additionally comprising the steps of:
   a. loading a transparent annotation screen on the first screen or on a second screen and appearing in the identical location as the embedded video location; and
   b. playing, on the transparent annotation screen, an annotation video during playing of the digital video mashup.

3. The method of claim 2 additionally comprising the steps of
   a. muting sound of the digital video mashup during playing.

4. The method of claim 1 wherein, the method additionally comprising the steps of:
   a. loading a transparent annotation screen on the first screen or on a second screen and appearing in the identical location as the embedded video location;
   b. in response to an input, retrieving a set of annotations, each annotation associated with an annotation start and end time and annotation instructions; and
   c. displaying, on the transparent annotation screen, each annotation from the set of annotations according to the associated annotation instructions and from a time-mapped annotation start time to a time-mapped annotation end time.

5. The method of claim 4 wherein the time-mapped annotation start time equals the total playing time of all previously played video clips plus the annotation start time minus the currently-playing video clip start time; and the time-mapped annotation end time equals the total playing time of all previously played video clips plus the annotation end time minus the currently-playing video clip start time.

6. A computer-implemented method for playing a digital video mashup comprised of at least two video clips, wherein the digital video mashup is represented by metadata comprising, for each video clip, a video clip access location, a video clip start time and a video clip end time, the method comprising the steps of:
   a. analyzing the metadata to determine a currently-playing embedded video player, a currently-playing video clip having a currently-playing video clip access location, a currently-playing video clip start time and a currently-playing video clip end time, a next-playing embedded video player, and a next-playing video clip having a next-playing video clip access location, a next-playing video clip start time and a next-playing video clip end time;
   b. loading the currently-playing embedded video player and making the currently-playing embedded video player visible in an embedded video location on a first screen;
   c. loading the next-playing embedded video player, in the embedded video location, and making the next-playing embedded video player hidden;
   d. loading the currently-playing video clip, in the currently-playing embedded video player, from the currently-playing video clip location, at the currently-playing video clip start time;
   e. loading the next-playing video clip, in the next-playing embedded video player, from the next-playing video access location, at the next-playing video clip start time;
   f. playing the loaded currently-playing video clip;
   g. when playing time reaches a time-mapped currently-playing video ending time, wherein the time-mapped currently-playing video clip ending time equals the currently-playing video clip end time less the currently-playing video clip start time plus a total playing time of all previously played video clips, making the currently embedded video player hidden and the next-playing embedded video player visible; and
   h. playing the loaded next-playing video clip.

7. The method of claim 6 additionally comprising the steps of:
   a. loading a transparent annotation screen on the first screen or on a second screen and appearing in the identical location as the embedded video location; and
   b. playing, on the transparent annotation screen, an annotation video during playing of the digital video mashup.

8. The method of claim 7 additionally comprising the steps of
   a. muting sound of the digital video mashup during playing.

9. The method of claim 6 additionally comprising the steps of:
   a. loading a transparent annotation screen on the first screen or on a second screen and appearing in the identical location as the embedded video location;
   b. in response to an input, retrieving a set of annotations, each annotation associated with an annotation start time, an annotation end time, and annotation instructions; and
   c. displaying, on the transparent annotation screen, each annotation from the set of annotations according to the associated annotation instructions and from a time-mapped annotation start time to a time-mapped annotation end time.

10. The method of claim 9 wherein the time-mapped annotation start time equals the total playing time of all previously played video clips plus the annotation start time minus the currently-playing video clip start time; and the time-mapped annotation end time equals the total playing time of all previously played video clips plus the annotation end time minus the currently-playing video clip start time.

\* \* \* \* \*